June 2, 1936.   J. A. ZUBLIN   2,043,142
METHOD OF IMPROVING THE WEAR RESISTANT QUALITIES OF A BODY
Filed Dec. 9, 1935
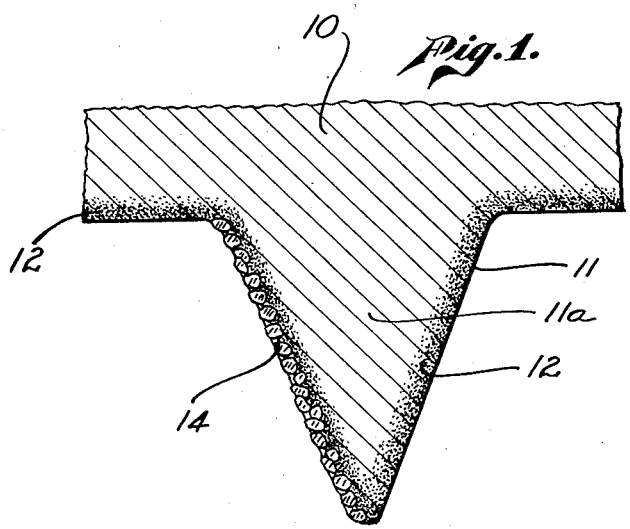
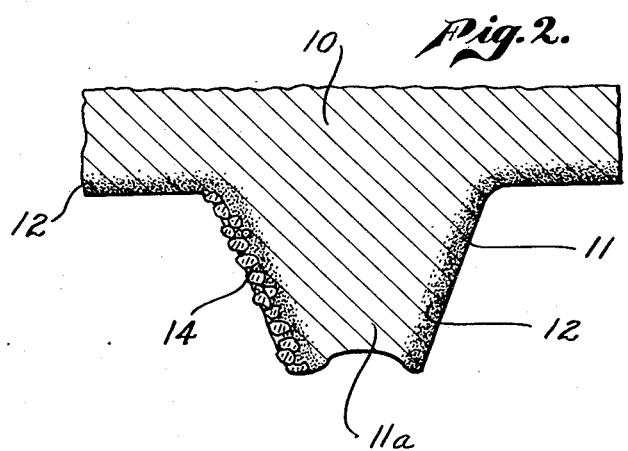
John A. Zublin
INVENTOR
BY [signature] Rodgers
ATTORNEY Patented June 2, 1936

2,043,142

UNITED STATES PATENT OFFICE 2,043,142

METHOD OF IMPROVING THE WEAR RESISTANT QUALITIES OF A BODY

John A. Zublin, Los Angeles, Calif.

Application December 9, 1935, Serial No. 53,621

7 Claims. (Cl. 76—108)

The present invention relates generally to methods of improving the wear resistant qualities of a body, such as a drill bit or the like, and more especially to conserving and effectively using the wear resistant qualities of the facing of tungsten carbide pieces or like material usually applied to such bodies. This invention is related to both of my prior Patents 1,855,330 granted April 26, 1932, and 2,021,040 granted November 12, 1935, and is in the nature of an improvement over both patents.

To make cutters for well drilling bits and similar tools more efficient and longer wearing, the cutters are faced with pieces of tungsten carbide, for this is one of the hardest substances known. The carbide pieces do the real work of cutting the earth formation, while the cutter body is in effect a carrier for the pieces of carbide, so it is essential both that the carbide be kept in a state of maximum hardness and that it be supported properly on the bit to effect best cutting and to prevent loss of the pieces.

When the tungsten carbide pieces are welded to the cutter before the cutter is carburized, the liquid steel, which is well below its saturation point with respect to carbon, readily absorbs carbon from the tungsten carbide which contains about 6% carbon by weight. Loss of even a small portion of its carbon during welding operations changes the chemical composition of the tungsten carbide and converts it to a much softer and less wear-resistant form, as is further described in my said Patent 2,021,040, in which I disclose another method of preserving the carbide in its harder form. The loss of carbon also brings about a loss in strength, and the carbide pieces then have a tendency to break or chip off the cutter, with an accompanying loss of cutting ability on the part of the cutter. The tungsten carbide pieces are further decomposed and weakened during subsequent steel carburizing of the cutter by the relatively high temperatures around 1800° Fahr. maintained for several hours.

Another disadvantage arising from welding tungsten carbide pieces to an uncarburized cutter is that the cutter teeth are not capable of proper support and retention of the carbide pieces deposited on their faces. After tungsten carbide has been applied, carburizing takes effect only on those exposed steel surfaces of the cutter having no tungsten carbide facing, since the carbide facing forms a barrier through which the carburizing can not penetrate to reach the body steel. As this carburized outer layer affords considerable stiffness to the tooth, which necessarily has a tough, relatively soft core to resist shock and prevent the tooth from breaking off, the maximum reinforcement of the tooth is only secured when the carburized layer is symmetrical and covers the entire steel surface of tooth. Further, the lack of uniformly hard, carburized material directly beneath the tungsten carbide permits the tooth to wear away relatively rapidly directly behind the carbide facing, and the undermined facing, being unsupported and having relatively low crushing strength itself, readily chips and breaks under the pressures encountered during drilling, losing the carbide pieces entirely.

These various conditions described decrease the hardness of the carbide pieces during manufacture of the bit and lessen the ability of the cutter to adequately carry and support the carbide pieces, so that the fullest cutting ability and wear resistance of the carbide facing are not developed.

It is therefore a general object of my invention to provide a method of manufacturing cutters that produces a cutter with a carbide facing of maximum cutting and wearing efficiency.

It is also a main object of my invention to decrease or prevent the tendency of the surrounding steel to take up large amounts of carbon from the tungsten carbide which thus loses part of its carbon content, for by maintaining the tunsten carbide substantially unchanged, its wear-resistant properties are fully retained and the applied carbide facing is stronger and more resistant to cracking and breaking.

Another object is to make each cutting edge, despite its comparatively soft center core, as stiff as possible and to back up the tungsten carbide with an outer layer of harder, more wear-resistant steel which also supports the tungsten carbide and holds it in place so that the maximum cutting effect and protection to the tooth against wear is obtained.

A further object is to avoid exposing the tungsten carbide to the relatively high and long-sustained temperatures encountered during the carburizing process and thereby eliminate deterioration and decomposition of the carbide.

I accomplish these aims by reversing the usual sequence of steps and fully carburizing the entire cutter prior to welding on the facing of tungsten carbide, so that the surface layers of cutter and of all its cutting edges are substantially saturated with carbon. The tungsten carbide is next welded to the desired portions of each tooth over the carburized layer. The cutter is then heat treated to harden the case layer which backs up the tungsten carbide facing and stiffens the entire tooth.

How the above and other objects and advantages of my invention are attained will now be better understood by reference to the following specification and the attached drawing.

Fig. 1 is an enlarged cross section of a typical tooth on a completed drill bit cutter; and Fig. 2 is similar to Fig. 1 but shows the tooth partially worn away.

It will be understood that my invention is not limited to any one style of cutter, though for purposes of illustration I show the invention as applied to a cutter with teeth of the kind shown; for the invention can be applied to any of the many cutters or cutting teeth or cutting edges of various tools.

As a typical example of the treatment of cutters, I shall now explain in detail the application of the invention to one kind of steel, but without any limitation thereto. Starting with a cutter having a composition corresponding to steel known as SAE 1020, the carbon content of the cutter is about .20%. The cutter is now placed in a case hardening or carburizing furnace and exposed to fumes of a carbonaceous material for about seven hours at a temperature around 1800° F. At the end of this time there will be over body 10 (Fig. 1) and tooth 11 an outer layer 12 in which the carbon content is about 1%, the layer varying in thickness but averaging around two to three thirty-seconds of an inch. It will be understood that beyond this thickness the carbon content gradually decreases to the .20% of the core of the tooth or body, for the carburizing is not effective to greater depths.

After removal from the carburizing furnace, the cutter is cooled slowly. The facing 14 of tungsten carbide pieces is then welded to the desired portions of the cutter or its teeth by any conventional fusion welding method. Finally, the cutter is heat treated to harden the carburized layer, by heating the cutter to 1425° F.–1550° F., for a period of one-half to one and one-half hours according to the cutter size, and then rapidly quenching in oil. This heat treatment may be also of such character as additionally to effect a dispersion of the carbon away from the steel immediately adjacent the tungsten carbide pieces, as disclosed in my Patent 1,855,330, should the concentration of carbon in the layer 12 exceed the desired maximum for the finished product and so make it too hard.

If for any reason of manufacturing convenience, the cutter is cooled more or less rapidly after carburizing, it may be at least partially and perhaps completely hardened before the carbide pieces are welded on. The welding operation will anneal or soften those parts of the cutter which have been heated and slowly cooled, but the final heat treatment is such as will re-harden such softer places as well as bring up to the desired maximum hardness any portions insufficiently hardened by the prior treatment.

The completed cutter has cutting portions or teeth 11 each comprising a core 11a of softer, tougher steel, because of its lower carbon content, compared with the outer layer 12 of higher carbon content covering the tooth, which has been made of greater hardness. Over the carburizing layer there is a facing 14 of metallic tungsten carbide pieces which may cover only a portion of the tooth, since the wear often comes on only one side or part of the tooth.

The carburizing procedure may be varied as to time, temperature and the like according to the process and the steels used, as cutters are often made of steel with an initial carbon content in excess of .20%. In the example given above, the limit of carburization is about 1.2% carbon in the layer 12, so that at about 1% the carbon content is fairly close to the saturation value and has reached what may be termed the practical or economical limit of carburization. Steel so fully carburized will be so inert toward carbon absorption that a tungsten carbide piece in contact with the molten steel during the short welding process will suffer little, if any, by carbon extraction. This same condition should be brought about by the carburizing treatment selected in accord with any other kinds of steel used.

Likewise the final heat treatment may be varied, as will be known by those skilled in the art, to best suit the circumstances and give the exact hardness desired, but in general will involve a rapid quench from a temperature of 1425° F. or higher to harden the carburized layer, though, as stated above, the heat treatment may also include other steps, as a final drawing, and so may also accomplish other changes in the steel of the cutter.

The pieces of tungsten carbide in facing 14 may vary greatly, and be any or all sizes from very fine to large, coarse pieces, typical and frequently found sizes being from 6 to 20 mesh. The invention is not limited to the carbide of tungsten, though it is especially applicable thereto and so described in that aspect, but other hard metallic carbides are included.

Referring to Fig. 2, it will be seen that the tooth core 11a, being the softest, wears the most, leaving the harder outside layers 12 and 14 protruding below the core so that they are subjected to heavy crushing loads. Without a carburized layer 12 beneath the tungsten carbide, the carbide facing is continually undermined as the soft core wears away and continually breaks off back to the softer supporting metal. But with the construction shown, layer 12 resists wear to a considerable degree and remains to support facing 14 which, instead of breaking off, remains in place and protects the softer core against wear. By this construction and method of making, the carbide layer offers the most resistance to wear and the cutter becomes a more efficient and longer lived cutting tool, actual experience showing increases of 15 to 40% in the footage dug by cutters made according to my invention as compared with conventional cutters of the same style and materials.

From the above description it will readily be seen that changes in the details of procedure will occur to and may be made by those skilled in the art without departing from the scope and spirit of my invention, and all such changes are to be considered as within the scope of the appended claims.

I claim as as my invention:

1. The method of imparting wear resistant qualities to a steel cutter for a well drilling bit, comprising the steps of increasing the carbon content of the surface of the cutter without final heat treatment, then welding tungsten carbide to said cutter by incipient fusion of the steel cutter and at a temperature above brazing, and then finally heat treating the carbon increased surface.

2. The method of imparting wear resistant qualities to a steel cutter for a well drilling bit, comprising the steps of increasing the carbon content of the surface of the cutter without final heat treatment, then welding a plurality of tungsten carbide particles to said cutter by incipient fusion of the steel cutter and at a temperature above brazing, and then finally heat treating the carbon increased surface.

3. The method of improving the cutting portions of a well drilling bit which comprises the steps of carburizing at least a portion of the exterior surface thereof, welding a carbide having the decomposable characteristics of tungsten carbide to said carburized surface by a fusion weld and at a temperature above a brazing temperature, and then hardening said carburized surface.

4. The method of improving the wear resistant qualities of a well drilling bit, which comprises providing the cutting portion of said bit with a layer of a case hardening element, welding thereto by a fusion weld above a brazing temperature a wear resisting composition having the decomposable characteristics of tungsten carbide, and hardening the case layer.

5. The method of improving the wear resistant qualities of a well drilling bit, which comprises providing the cutting portion of said bit with a layer of a case-hardening element, welding thereto by a fusion weld above a brazing temperature a wear resisting composition containing said case-hardening element as an essential ingredient and decomposable at a welding temperature, and then heat treating the case layer.

6. The method of improving the wear resistant qualities of a well drilling bit, which comprises the steps of increasing the combined carbon content of the outside surface of the bit by a heat treating operation, welding by a fusion weld above a brazing temperature a decomposable hard metal carbide to said surface having the increased combined carbon content, and then finally heat treating said surface.

7. The method of improving the wear resistant qualities of a well drilling bit cutter, which comprises the steps of treating a steel cutter having a carbon content of the order of .20%, carburizing the same in a furnace to provide the outer layer thereof with a carbon content of the order of 1%, removing it from the furnace, welding to said outer layer at a fusion temperature above brazing a decomposable carbide of the tungsten carbide class, and finally hardening the carburized layer.

JOHN A. ZUBLIN.